United States Patent
Park et al.

(10) Patent No.: US 8,184,588 B2
(45) Date of Patent: May 22, 2012

(54) APPARATUS AND METHOD FOR PERFORMING FAST HANDOVER

(75) Inventors: Soo-hong Park, Yongin-si (KR); Young-keun Kim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1398 days.

(21) Appl. No.: 11/471,500

(22) Filed: Jun. 21, 2006

(65) Prior Publication Data

US 2006/0291425 A1 Dec. 28, 2006

(30) Foreign Application Priority Data

Jun. 28, 2005 (KR) .................. 10-2005-0056456

(51) Int. Cl.
*H04W 4/00* (2009.01)
(52) U.S. Cl. ........................ 370/331; 455/436
(58) Field of Classification Search .......... 370/331–334; 455/436
See application file for complete search history.

(56) References Cited

U.S. PATENT DOCUMENTS

| | | | |
|---|---|---|---|
| 6,473,413 B1 | 10/2002 | Chiou et al. | |
| 6,978,137 B2 | 12/2005 | Gwon et al. | |
| 7,522,558 B2 | 4/2009 | Ikeda | |
| 2003/0104814 A1 | 6/2003 | Gwon et al. | |
| 2003/0136827 A1* | 7/2003 | Kaneko et al. | 235/375 |
| 2004/0066757 A1 | 4/2004 | Molteni et al. | |
| 2004/0253954 A1* | 12/2004 | Lee et al. | 455/436 |
| 2005/0030945 A1 | 2/2005 | Sarikaya et al. | |
| 2005/0149626 A1 | 7/2005 | Manchester et al. | |
| 2006/0187858 A1 | 8/2006 | Kenichi et al. | |
| 2009/0323646 A1* | 12/2009 | Ketchum et al. | 370/338 |

FOREIGN PATENT DOCUMENTS

| | | |
|---|---|---|
| CN | 1610439 A | 4/2005 |
| EP | 1 524 814 A1 | 5/2005 |
| JP | 2003-134149 | 5/2003 |
| KR | 2004-70891 A | 8/2004 |
| WO | WO 03/003639 A2 | 1/2003 |
| WO | WO 2004/077747 A1 | 9/2004 |

OTHER PUBLICATIONS

Office Action issued by the State Intellectual Property Office of China in Chinese Patent Application No. 2006800235782 on May 8, 2009.
U.S Appl. No. 11/471,499, filed Jun. 21, 2006, Soo-hong Park et al., Samsung Electronics Co., Ltd.

(Continued)

*Primary Examiner* — Marcos Batista
(74) *Attorney, Agent, or Firm* — Staas & Halsey LLP

(57) ABSTRACT

An apparatus and a method to perform a fast handover that is capable of determining whether to switch an internet protocol (IP) using a received, unique code of an access router when a mobile node performs a fast handover in a wireless network. The apparatus to perform a fast handover includes a signal receiving unit to receive a signal, a subnet change determining unit to determine if a subnet change has occurred by referring to an access router identification (ID) included in the received signal, a trigger unit to perform a layer trigger depending upon the determination result as to whether a subnet change has occurred, and a handover performing unit to perform a handover according to the layer trigger.

49 Claims, 6 Drawing Sheets

OTHER PUBLICATIONS

Search Report issued by the International Searching Authority on Oct. 19, 2006 for PCT International Application PCT/KR2006/002495.

Jordan et al. "Link-Layer for Fast Mobile IPv6 Handover in Wireless LAN based Networks." Local and Metropolitan Area Networks, 2004. LANMAN 2004. The 13th IEEE Workshop on Apr. 25-28, 2004 pp. 139-143.

Kim et al. "A Fast Handoff Scheme for Mobile Ipv6 Based Wireless Networks." Information, Communication and Signal Processing, 2005 Fifth International Conference on Dec. 6-9, 2005 pp. 669-672.

Leggio et al. "Achieving Seamless Mobility in IP-based Radio Access Networks." Wireless Communications, IEEE, vol. 12, Issue 1, Feb. 2005 pp. 54-59.

Lin et al. "LIHP: A Low Latency Layer-3 Handoff Scheme for 802.11 Wireless Networks." World of Wireless, Mobile and Multimedia Networks, 2006 (WoWMoM). International Symposium on Jun. 26, 2006 pp. 401-409.

Chinese Office Action dated Aug. 7, 2009, issued Chinese patent application (No. 200680023287.3).

U.S. Office Action mailed Oct. 2, 2009 in corresponding U.S. Appl. No. 11/471,499.

* cited by examiner

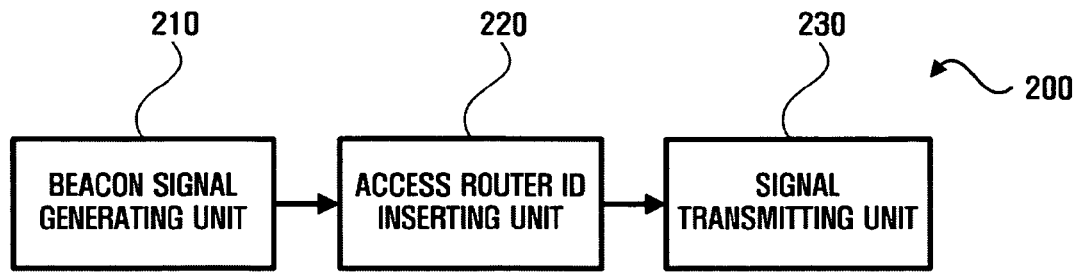
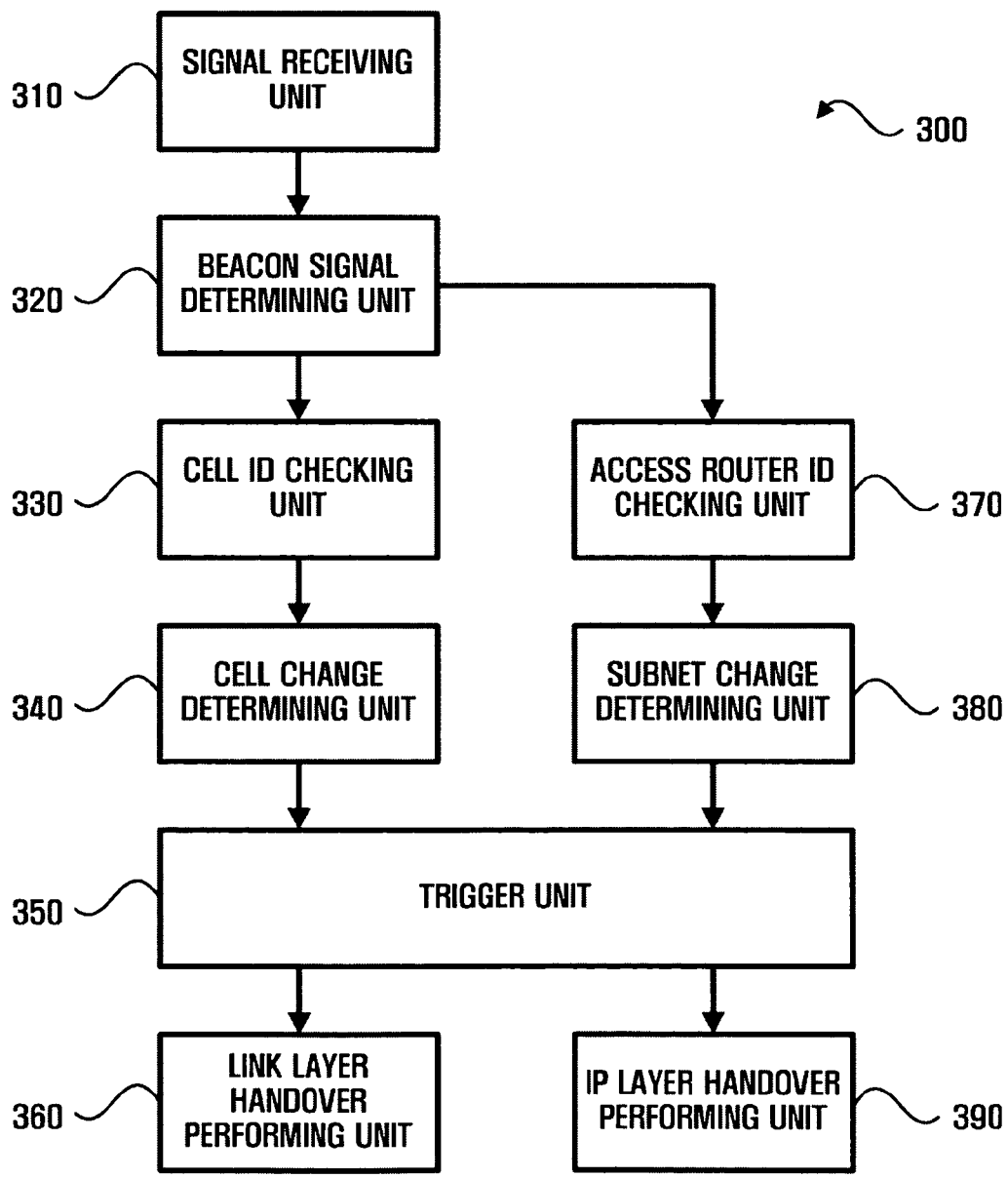

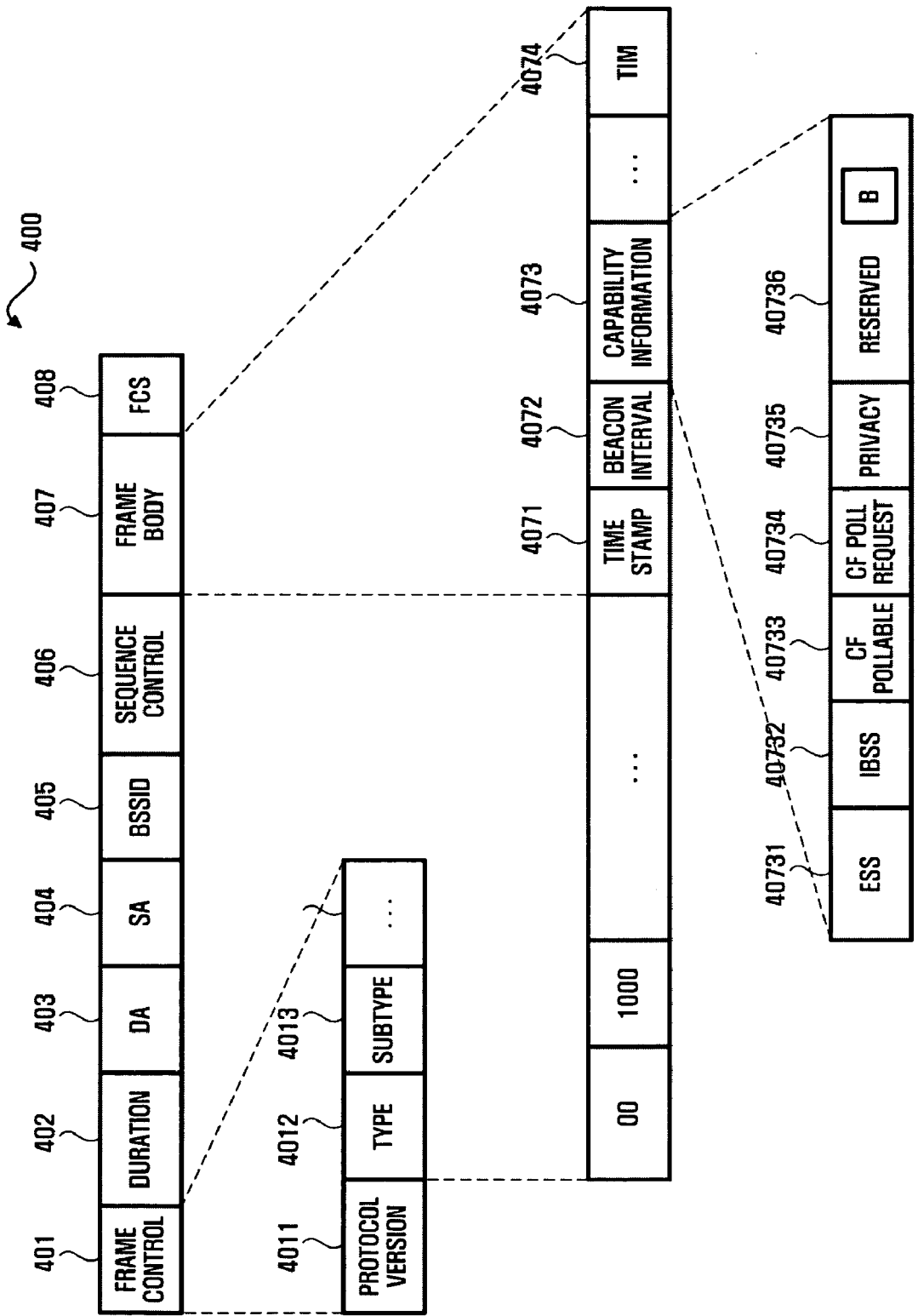

APPARATUS AND METHOD FOR PERFORMING FAST HANDOVER

CROSS-REFERENCE TO RELATED APPLICATION

This application claims all benefits accruing under 35 U.S.C §119 from Korean Patent Application No. 2005-56456 filed on Jun. 28, 2005, in the Korean Intellectual Property Office, the disclosure of which is incorporated by reference herein.

BACKGROUND OF THE INVENTION

1. Field of the Invention

Aspects of the invention relate to apparatus and methods to perform fast handovers. More particularly, aspects of the invention relate to an apparatus and a method to perform a fast handover that is capable of determining whether to switch an internet protocol (IP) using a received, unique code of an access router when a mobile node performs a fast handover in a wireless network.

2. Description of the Related Art

A rapid increase of users of mobile communication services has led to the activation of mobile communication services supporting multimedia communications, and seamless communication services have been requested by mobile users. Accordingly, it has become important to achieve a fast handover in the wireless local area network (LAN) environment based on the Institute of Electrical and Electronics Engineers (IEEE) 802.11 standard specification.

FIG. 1 illustrates a conventional wireless LAN environment. As illustrated, the wireless LAN environment includes a mobile node 1, a first access point 21, a second access point 22, a third access point 23, a fourth access point 24, a first access router 31 and a second access router 32. The conventional wireless LAN environment will be explained under the assumption that the mobile node connected to the first access point 21 passes through respective cells managed by the first access point 21, the second access point 22, the third access point 23, and the fourth access point 24 in sequence. The first to fourth access points 21, 22, 23 and 24 periodically transmit beacon signals to indicate their cells so that the mobile node 1 in motion can know with which access point it can attach to the wired network.

In the communications denoted by 211 in FIG. 1, the mobile node 1 receives a beacon signal from the first access point 21. Based on the received beacon signal, the mobile node 1 becomes aware that it is positioned within the cell managed by the first access point 21. The mobile node 1 accesses a wired network by way of the first access point 21, as it did previously.

In the communications denoted by 221, the mobile node 1 receives a beacon signal from the second access point 22. Based on the received beacon signal, the mobile node 1 becomes aware that the cell in which it is positioned has changed. Accordingly, the mobile node 1 conducts a handover due to the change of the cell (i.e., a handover in a link layer). That is, the mobile node 1 becomes aware that it is positioned in the cell managed by the second access point 22, and changes its link layer connection with the first access point 21 to a link layer connection with the second access point 22. The mobile node 1 accesses a wired network by way of the second access point 22 with which it forms a new connection.

In the communications denoted by 222, the mobile node 1 transmits information that its cell has changed to the first access router 31 via the second access point 22. The first access router 31 receives this information, not through other access routers, and becomes aware that the mobile node 1 is positioned within the subnet that it manages.

In the communications denoted by 223, the first access router 31 transmits information, which details that its subnet has not changed, to the mobile node 1 by way of the second access point 22. The mobile node 1 that received this information becomes aware that it is positioned in the subnet managed by the first access router 31. That is, the mobile node 1 becomes aware that it does not need to generate a new Internet protocol (IP) address for use in a new subnet. Accordingly, the mobile node 1 does not perform a handover due to the change of the subnet (i.e., a handover in the IP layer).

In the communications denoted by 224, the mobile node 1 receives a beacon signal from the second access point 22. Based on the received beacon signal, the mobile node 1 becomes aware that it is positioned within the cell managed by the second access point 22. The mobile node 1 connects to a wired network by way of the second access point 22, as it did previously.

In the communications denoted by 231, the mobile node 1 receives a beacon signal from the third access point 23. Based on the received beacon signal, the mobile node 1 becomes aware that its cell has changed. Accordingly, the mobile node 1 performs a handover due to the change of the cell (i.e., a handover in a link layer). That is, the mobile node 1 becomes aware that it is positioned within the cell managed by the third access point 23 and changes its link layer connection with the second access point 22 to a link layer connection with the third access point 23. The mobile node 1 accesses a wired network by way of the third access point 23 with which it forms a new connection.

In the communications denoted by 232, the mobile node 1 transmits information that its cell has changed to the first access router 31 by way of the third access point 23 and the second access router 32. The first access router 21 that has received this information by way of the second access router 32 becomes aware that the mobile node 1 has left its subnet.

In communications denoted by 233, the first access router 31 transmits to the mobile node 1 information that its subnet has changed, by way of the second access router 32 and the third access point 23. The mobile node 1 that has received this information becomes aware that the subnet in which it is positioned has changed. Accordingly, the mobile node 1 conducts a handover due to the change of the subnet (i.e., a handover in an Internet protocol (IP) layer). That is, the mobile node 1 becomes aware that it is positioned within the subnet managed by the second access router 32, and performs the communication operation denoted by 234.

In the communications denoted by 234, in order to generate a new IP address for use in the subnet managed by the second access router 32, the mobile node 1 requests the second access router 32 to provide a network prefix of the subnet managed by the access router 32, via the third access point 23. In response to the request, the mobile node 1 acquires the network prefix of the subnet managed by the second access router 32. Based on the network prefix, the mobile node 1 generates a new IP address and performs communications with the subnet managed by the second access router 32 using the new IP address.

In the communications denoted by 235, the mobile node 1 receives a beacon signal from the third access point 23. Based on the received beacon signal, the mobile node 1 becomes aware that it is positioned within the cell managed by the third access point 23. The mobile node 1 accesses a wired network by way of the third access point 23, as it did previously.

In the communications denoted by 241, the mobile node 1 receives a beacon signal from the fourth access point 24. Based on the received beacon signal, the mobile node 1 becomes aware that its cell has changed. Accordingly, the mobile node 1 performs a handover due to the change of the cell (i.e., a handover in the link layer). That is, the mobile node 1 becomes aware that it is positioned within the cell managed by the fourth access point 24 and changes its link layer connection with the third access point 23 to a link layer connection with the fourth access point 24. The mobile node 1 accesses a wired network by way of the fourth access point 24 with which it forms a new connection.

In communications denoted by 242, the mobile node 1 transmits information that its cell has changed to the second access router 32 via the fourth access point 24. The second access router 32 that received this information, not through another access router, becomes aware that the mobile node 1 is positioned within its subnet.

In the communications denoted by 243, the second access router 32 transmits information that its subnet has not changed to the mobile node 1 via the fourth access point 24. The mobile node 1 that received this information becomes aware that it is positioned within the subnet managed by the second access router 32. That is, the mobile node 1 becomes aware that it does not need to generate a new IP address for use in a new subnet. Accordingly, the mobile node 1 does not perform a handover due to the change of the subnet (i.e., a handover in the IP layer).

As described above, the mobile node 1, which checked for a change of a cell through a beacon signal received via an access point, communicates with an access router in order to check for a subnet change between a previous cell and a new cell. In this regard, the mobile node communicates with the access router in order to determine whether to perform only a link layer handover or both a link layer handover and an IP layer handover. Whenever the cell changes, mobile node has to communicate with the access router via an access point, and this can cause difficulty in realizing fast handovers.

SUMMARY OF THE INVENTION

Accordingly, several example embodiments and aspects of the invention address the above-described and other problems and difficulties, and promote eliminating any unnecessary communication between a mobile node and an access router by providing the mobile node with information to determine whether to perform only a link layer handover or both the link layer handover and an IP layer handover.

According to an aspect, among aspects, of the invention, there is provided an apparatus to perform a fast handover, including: a signal receiving unit to receive a signal; a subnet change determining unit tot determine if a subnet change has occurred by referring to an access router ID included in the received signal; a trigger unit to perform a layer trigger depending upon the determination result as to whether the subnet change has occurred; and a handover performing unit to perform a handover according to the layer trigger.

According to another aspect, among aspects, of the invention, there is provided an apparatus to perform a fast handover, including: a beacon generating unit to generate a beacon signal: an access router identification (ID) inserting unit to insert an access router ID into the beacon signal; and a signal transmitting unit to transmit the beacon signal that contains the access router ID.

According to a further aspect, among aspects, of the invention, there is provided a method of performing a fast handover, including: generating a beacon signal; inserting an access router ID into the beacon signal; and transmitting the beacon signal that contains the access router ID.

Additional aspects and/or advantages of the invention are set forth in the description which follows or are evident from the description, or can be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a block diagram illustrating an access point according to an exemplary embodiment of the invention;

FIG. 3 is a block diagram illustrating an apparatus to perform a fast handover according to an exemplary embodiment of the invention;

FIG. 4 illustrates the format of a beacon frame according to an exemplary embodiment of the invention;

DETAILED DESCRIPTION OF THE EMBODIMENTS

Figure 1:
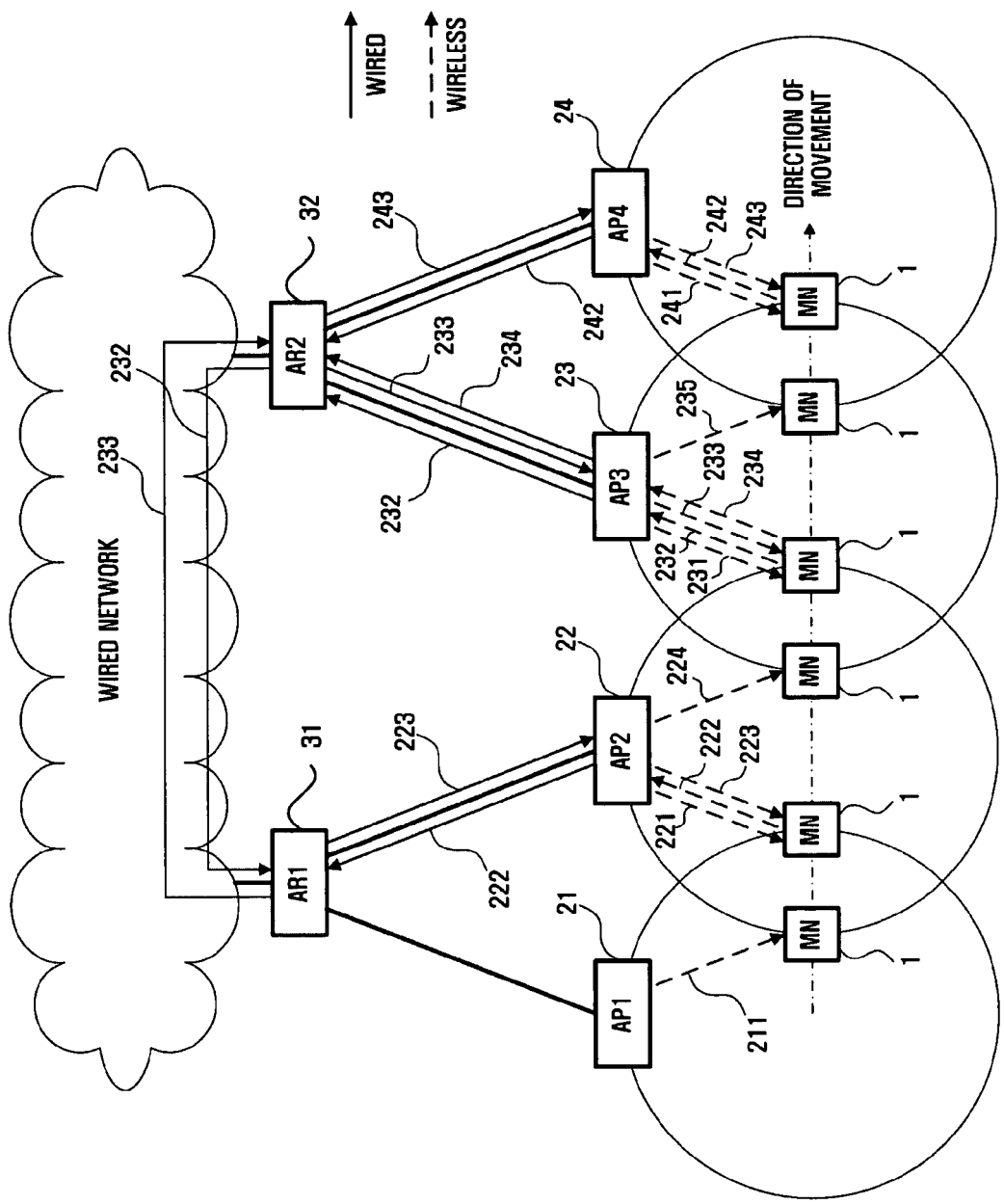
FIG. 1 illustrates a conventional wireless LAN environment.

Reference will now be made in detail to embodiments of the invention, examples of which are illustrated in the accompanying drawings, wherein like reference numerals refer to the like elements throughout. The embodiments are described below in order to explain aspects of the invention by referring to the figures, with well-known functions or constructions not necessarily being described in detail.

FIG. 2 is a block diagram illustrating an access point 200 according to an exemplary embodiment of the invention. As illustrated, the access point 200 includes a beacon signal generating unit 210, an access router identification (ID) inserting unit 220, and a signal transmitting unit 230. The beacon signal generating unit 210 generates a beacon signal to identify a cell managed by an access point, such as the access point 200. The mobile node that received the beacon signal becomes aware that it is positioned in a specific access point's cell based on the cell ID included in the beacon signal. For the beacon signal generated by the beacon signal generating unit 210, a beacon frame according to the IEEE 802.11 standard specification can be used, for example. However, it is understood that other beacon signals can be used in other networks in addition to or instead of the beacon signal of the IEEE 802.11 standard.

The access router ID inserting unit 220 inserts the ID of an access router into a beacon signal generated by the beacon signal generating unit 210. The access router ID refers to the proper ID of the access router connected directly to the access point 200 (i.e., by wire), for example. The mobile node determines whether to change its subnet based on the access router ID inserted by the access router ID inserting unit 220 into the beacon signal generated by the beacon signal generating unit 210. The signal transmitting unit 230 transmits the beacon signal including the access router ID to the mobile node. According to an embodiment and aspects of the invention, addition of the access router ID inserting unit 220 to the access points can minimize the change in configuration of the existing access points.

FIG. 3 is a block diagram illustrating an apparatus 300 to perform a fast handover according to an exemplary embodiment and aspects of the invention. The illustrated apparatus 300 includes a signal receiving unit 310, a beacon signal determining unit 320, a cell ID checking unit 330, a cell change determining unit 340, a trigger unit 350, a link layer handover performing unit 360, an access router ID checking unit 370, a subnet change determining unit 380, and an IP layer handover performing unit 390. The signal receiving unit 310 receives a signal from an access point. In this regard, the signal receiving unit 310 receives a beacon from an access point, such as the access point 200, composing a cell region where the apparatus 300 is positioned, or data from another mobile node. While not required in all aspects, the apparatus 300 can be included in a computer, a personal digital assistant or other like device.

The received signal received by the signal receiving unit 310 is transmitted to the beacon signal determining unit 320. The beacon signal determining unit 320 determines whether the transmitted signal is a beacon signal by referring to a predetermined field included in the received signal (frame), an example of which is further described with reference to FIG. 4. When it is determined by the beacon signal determining unit 320 that the signal is a beacon signal, the cell ID checking unit 330 checks the cell ID included in the beacon signal. The cell ID checking unit 330 also checks the cell ID through the predetermined field included in the received frame, also to be further described with reference to FIG. 4.

The cell change determining unit 340 determines whether to change the cell in which a mobile node is positioned depending upon the result of the check by the cell ID checking unit 330. When the cell ID checked by the cell ID checking unit 330 is not the same as that of the cell checked previously, the cell change determining unit 340 determines that the mobile node has changed cells. The result of the determination is a frame including a predetermined parameter (hereinafter referred to as a "trigger frame") that is transmitted to the trigger unit 350.

The trigger unit 350 performs a trigger based on the determination by the cell change determining unit 340. When it is checked from the trigger frame transmitted by the cell change determining unit 340 that the cell has changed, the trigger unit 350 performs a layer-2 trigger. According to the layer-2 trigger, the link layer handover performing unit 360 performs a handover in the link layer. That is, a connection with the previous access point is interrupted, and a connection with a new access point is established. The access router ID checking unit 370 checks the ID of an access router, which refers to information included in the signal determined by the beacon signal determining unit 320 to be a beacon signal (i.e., the beacon signal received from the access point). The access router ID included in the beacon signal will be further described with reference to FIG. 4.

The subnet change determining unit 380 determines whether to change the subnet of the mobile node according to the result of the check by the access router ID checking unit 370. In this regard, the previously received ID of the access router is compared with the current ID of the access router. When the previously received ID of the access router and the current ID of the access router are not identical, the subnet change determining unit 380 determines that the mobile node has changed subnets. While not required in all aspects, the apparatus 300 can be provided with or connected to a storage unit (not shown) to temporarily store the previous ID of the access router or can be otherwise accessed. The determination result of the subnet change determining unit 380 is a trigger frame that is transmitted to the trigger unit 350.

The trigger unit 350 performs a trigger based on the determination by the subnet change determining unit 380. When it is determined, based on the trigger frame transmitted from the subnet change determining unit 380, that the subnet has changed, the trigger unit 350 performs a layer-3 trigger. According to the layer-3 trigger, the IP layer handover performing unit 390 performs a handover in the IP layer. In this regard, the IP layer handover performing unit 390 acquires a network prefix of the new subnet, and generates a new IP address for use in the new subnet, and the mobile node is allowed to perform communications using the newly generated IP address.

FIG. 4 illustrates the format of a beacon frame 400 according to an exemplary embodiment and aspects of the invention. Referring to FIG. 4, a management frame according to the IEEE 802.11 standard specification includes a frame control field 401, a duration field 402, a destination address field 403, a source address field 404, a basic service set ID field (BSSID) 405, a sequence control field 406, a frame body field 407, and a frame check sequence field 408.

The cell change determining unit 340 can determine whether to perform the cell change due to the movement of the apparatus 300 based on the value included in the basic service set ID field 405. The ID of the previous cell is compared with that of the current cell, and it is determined whether to change the cell depending upon whether they are identical, for example.

The frame control field 401 includes a protocol version field 4011, a type field 4012, a subtype field 4013, and other appropriate fields, for example. According to the IEEE 802.11 standard specification, the beacon frame 400 is a type of management frame having a subtype field 4013 with a value of 100. The beacon signal determining unit 320 checks whether the value of the subtype field 4103 of the received frame is 100, in order to check whether the received signal is a beacon signal. For reference, a frame whose type field 4012 has a value of 0 is a management frame. The frame body field 407 of the beacon frame 400 includes a time stamp field 4071, a beacon interval field 4072, a capability information field 4073, a traffic indication map (TIM) field 4074, and other appropriate fields, for example. The capability information field 4073 includes an extended service set field (ESS) 40731, an independent basic service set (BSS) (IBSS) field 40732, a contention free (CF) pollable field 40733, a contention free poll request field 40734, a privacy field 40735, and a reserved field 40736. However, it is understood that the fields can be included in other frames, such as where other standards are used.

As illustrated in FIG. 4, the reserved field 40736 of the capability information field 4073 of the frame body field 407 of a beacon frame 400 can be used in order to insert an access router ID into the beacon frame 400. The access router ID refers to the unique ID assigned to each access router, on which basis the mobile node determines whether its subnet has changed. Different IDs can be assigned to each access router, or a subnet-based ID can be assigned. When the ID is assigned based on the subnet, the access routers can have identical IDs. In this regard, the mobile node performs no change of the subnet, even after it has changed cells, because of it has moved within the same subnet.

Figure 5:
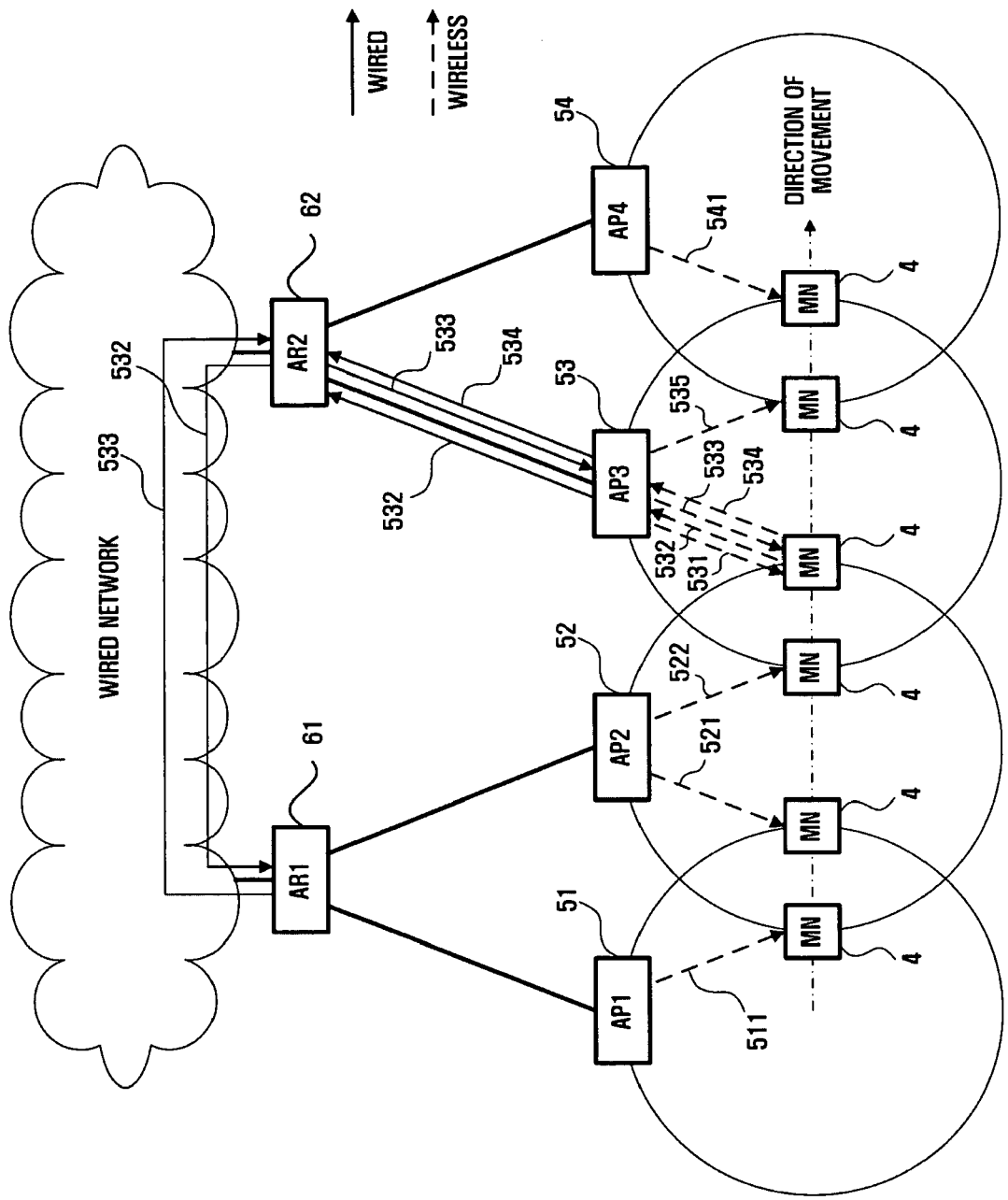
FIG. 5 illustrates a wireless LAN environment according to an exemplary embodiment of the invention.

FIG. 5 illustrates a wireless LAN environment according to an exemplary embodiment and aspects of the invention. The wireless LAN environment includes a mobile node 4, a first access point 51, a second access point 52, a third access point 53, a fourth access point 54, a first access router 61, and a second access router 62. As illustrated, the exemplary embodiment of FIG. 5 will be described under the assumption that the mobile node 4 is connected to the first access point 51, and then passes through respective cells managed by the first access point 51, the second access point 52, the third access point 53, and the fourth access point 54 in sequence.

The first access point 51, the second access point 52, the third access point 53 and the fourth access point 54 each periodically transmit a beacon signal identifying the cell they manage in order to inform the moving mobile node 4 which access point it can use to connect to the wired network. The sent beacon signal includes the ID of the access router connected to each access point.

In the communications denoted by 511, the mobile node 4 receives a beacon signal from the first access point 51. Based on the received beacon signal from the first access point 51, the mobile node 4 becomes aware that it is positioned within the cell managed by the first access point 51. The received beacon signal in the 511 communications includes the ID of the first access router 61 connected to the first access point 51, and the mobile node 4 temporarily stores the ID of the first access router 61. The mobile node 4 connects to the wired network via the first access point 51 as it did previously.

In the communications denoted by 521, the mobile node 4 receives a beacon signal from the second access point 52. Based on the received beacon signal from the second access point 52, the mobile node 4 becomes aware that it is in a new cell. Accordingly, the mobile node 4 performs a handover due to the cell change (i.e., a handover in the link layer). That is, the mobile node 4 becomes aware that it is positioned within the cell managed by the second access point 52, and changes its link layer connection with the first access point 51 to a link layer connection with the second access point 52. The mobile node 4 connects to the wired network via the second access point 52 with which it forms a new connection. Since the second access point 52 is included in the subnet managed by the first access router 61, the mobile node 4 receives a beacon signal in the 521 communications including the ID of the first access router 61 from the second access point 52. The mobile node 4 that received the beacon signal in the 521 communications including the access router ID compares the previously stored access router ID received in the 511 communications with the current access router ID. Since the access router ID stored in the 511 communication operation is identical to the access router ID received in the 521 communication operation, the mobile node 4 determines that its subnet has not changed.

In the communications denoted by 522, the mobile node 4 receives a beacon signal from the second access point 52. Based on the received beacon signal from the second access point 52, the mobile node 4 becomes aware that it is positioned within the cell managed by the second access point 52. The mobile node 4 connects to the wired network via the second access point 52 as it did previously. Since the second access point 52 is included in the subnet managed by the first access router 61, the mobile node 4 receives a beacon signal including the ID of the first access router 61 from the second access point 52.

In the communications denoted by 531, the mobile node receives a beacon signal from the third access point 53. Based on the received beacon signal from the third access point 53, the mobile node 4 becomes aware that it is positioned in a new cell. Accordingly, the mobile node 4 performs a handover due to the cell change (i.e., a handover in the link layer). That is, the mobile node 4 becomes aware that it is positioned within the cell managed by the third access point 53, and changes its link layer connection with the second access point 52 to a link layer connection with the third access point 53. The mobile node 4 accesses the wired network via the third access point 53 with which it forms a new connection. Since the third access point 53 is included in the subnet managed by the second access router 62, the mobile node 4 receives from the third access point 53 a beacon signal containing the ID of the second access router 62. The mobile node 4 that received the beacon signal from the third access point 53 containing the access router ID compares the previously stored access router ID with the current access router ID. Since the access router ID stored in the 511 communication operation is not identical to that received in the 531 communication operation, the mobile node 4 determines that it is in a new subnet.

In the communications denoted by 532, when it is determined that the subnet of the mobile node 4 has changed, the mobile node 4 sends information that its cell has changed to the first access router 61 via the third access point 53 and the second access router 62. The first access router 61, receiving this information through the second access router 62, becomes aware that the mobile node 4 has left its subnet.

In the communications denoted by 533, the first access router 61 sends information that the subnet in which the mobile node 4 is positioned has changed, via the second access router 62 and the third access point 53. The mobile node 4 receives this information and checks if its subnet has changed and, if changed, the mobile node 4 performs a handover due to the subnet change (i.e., a handover in the IP layer). In this regard, the mobile node 4 checks that it is positioned within the subnet managed by the second access router 62, and performs the 534 communication operation, to be further described. Since the mobile node 4 receives information that its subnet has changed after it was determined that its subnet had changed, the mobile node 4 just checks that the subset had changed.

In the communications denoted by 534, the mobile node 4 sends the second access router 62, via the third access point 53, a request for the network prefix of the subnet that the second access router 62 manages in order to generate a new IP address for use in the subnet. In response to this request, the mobile node 4 obtains the network prefix of the subnet managed by the second access router 62, and generates a new IP address based on the network prefix. Then, using the new IP address, the mobile node 4 performs communications with this subnet managed by the second access router 62.

In the communications denoted by 535, the mobile node 4 receives a beacon signal from the third access point 53. Based on the received beacon signal from the third access point 53, the mobile node 4 becomes aware that it is positioned within the cell managed by the third access point 53. As it did previously, the mobile node 4 accesses the wired network via the third access point 53.

In the communications denoted by 541, the mobile node 4 receives a beacon signal from the fourth access point 54. Based on the received beacon signal from the fourth access point 54, the mobile node 4 becomes aware that it is in a new cell. Accordingly, the mobile node 4 performs a handover due to the cell change (i.e., a handover in the link layer). In this regard, the mobile node 4 becomes aware that it is positioned within the cell managed by the fourth access point 54, and changes its link layer connection with the third access point 53 to a link layer connection with the fourth access point 54. The mobile node 4 accesses the wired network via the fourth access point 54 with which it forms a new connection. As described above, according to aspects of the invention, the mobile node 4 performs communications with an access router only when it is determined that its subnet has changed, thereby helping to promote the elimination of unnecessary communications with other access routers.

Figure 6:
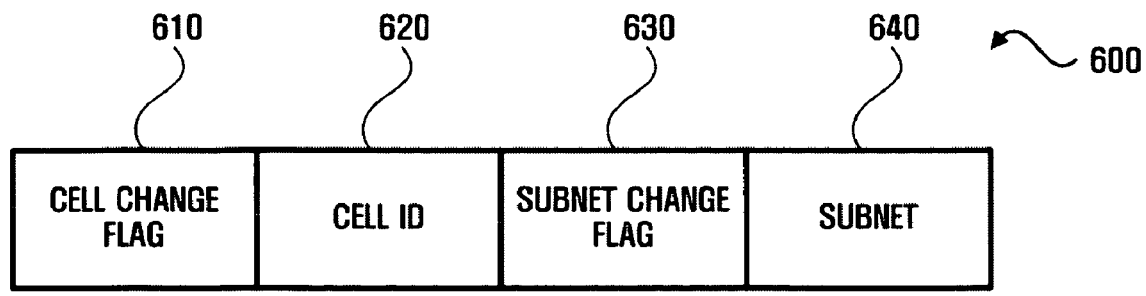
FIG. 6 illustrates a trigger frame according to an exemplary embodiment of the invention.

FIG. 6 illustrates a trigger frame 600 usable with the trigger unit 350 according to an exemplary embodiment and aspects of the invention. The trigger frame 600 includes a cell change flag 610, a cell ID 620, a subnet change flag 630, and a subnet parameter 640. However, it is understood that the trigger frame 600 can include other elements instead of or in addition to the illustrated elements. The cell change flag 610 indicates whether the cell of the mobile node 4 has changed. Depending upon a cell change of the mobile node 4, the cell change determining unit 340 can set this flag value. When the cell of the mobile node 4 has not changed, the value is set to 0 by the cell change determining unit 340. When the cell of the mobile node 4 has changed, the value is set to 1 by the cell change determining unit 340. The cell change flag 610 typically only indicates whether the cell has changed, and thus it can be implemented as a 1-bit field, according to aspects of the invention. The cell ID 620 refers to the cell ID of a new access point. The trigger unit 350 checks the cell ID 620 when the value of the cell change flag 610 is 1. Thereafter, the mobile node 4 communicates with an access point using the changed cell ID indicated by the cell ID 620.

The subnet change flag 630 indicates whether the subnet of the mobile node 4 has changed. The subnet change determining unit 380 can set a value of the subnet change flag 630 depending upon whether the subnet of the mobile node 4 has changed. When the subnet of the mobile node 4 has not changed, the value of the subnet change flag 630 is set to 0 by subnet change determining unit 380. When the subnet of the mobile node 4 has changed, the value of the subnet change flag 630 is set to 1 by subnet change determining unit 380. The subnet change flag 630 typically only indicates whether the subnet has changed, and thus subnet change flag 630 can be realized as a 1-bit field, according to aspects of the invention. The subnet parameter 640 refers to the subnet of a new access router. The trigger unit 350 checks the subnet parameter 640 when the value of the subnet change flag 630 is 1. Thereafter, the mobile node 4 communicates with an access point using the IP address including the new subnet indicated by the subnet parameter 640.

Figure 7:
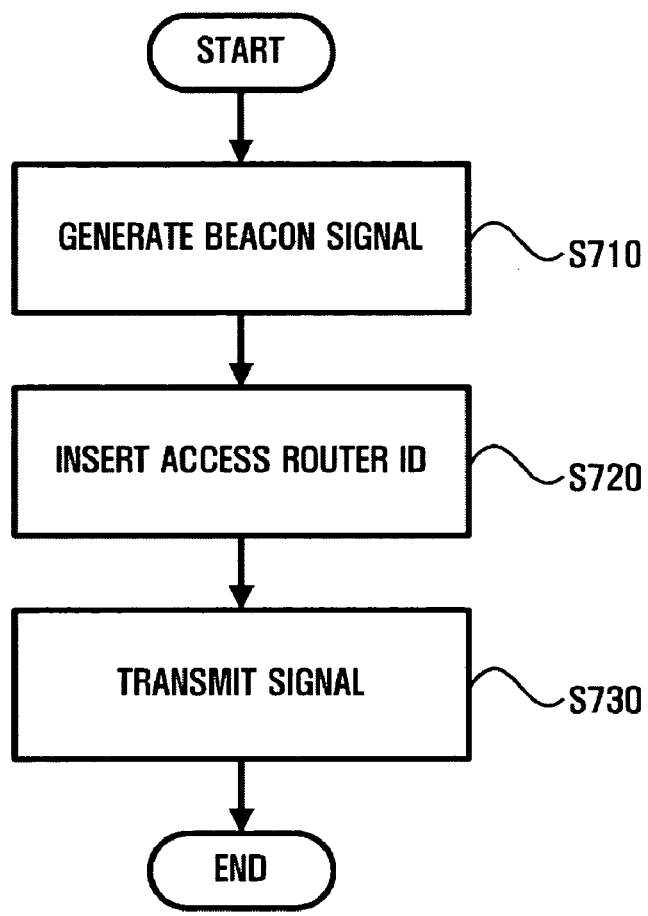
FIG. 7 is a flow chart illustrating operations of the access point according to an exemplary embodiment of the invention.

FIG. 7 illustrates operations of the access point 200 according to an exemplary embodiment and aspects of the invention. The access point 200 first generates a beacon signal at operation S710. The generated beacon signal is a beacon frame, such according to the IEEE 802.11 standard specification, and the beacon frame contains a cell ID to identify a cell region formed by the access point 200. The mobile node 4 checks for a cell change through the cell ID included in the beacon signal.

Then, the access point 200 inserts an access router ID into the generated beacon signal at operation S720. The access router ID is the unique ID of the access router connected directly to the access point, such as the access point 200, and the access router ID is used when the mobile node 4 checks for a subnet change. The access point 200 periodically transmits the beacon signal including the access router ID at operation S730.

Figure 8:
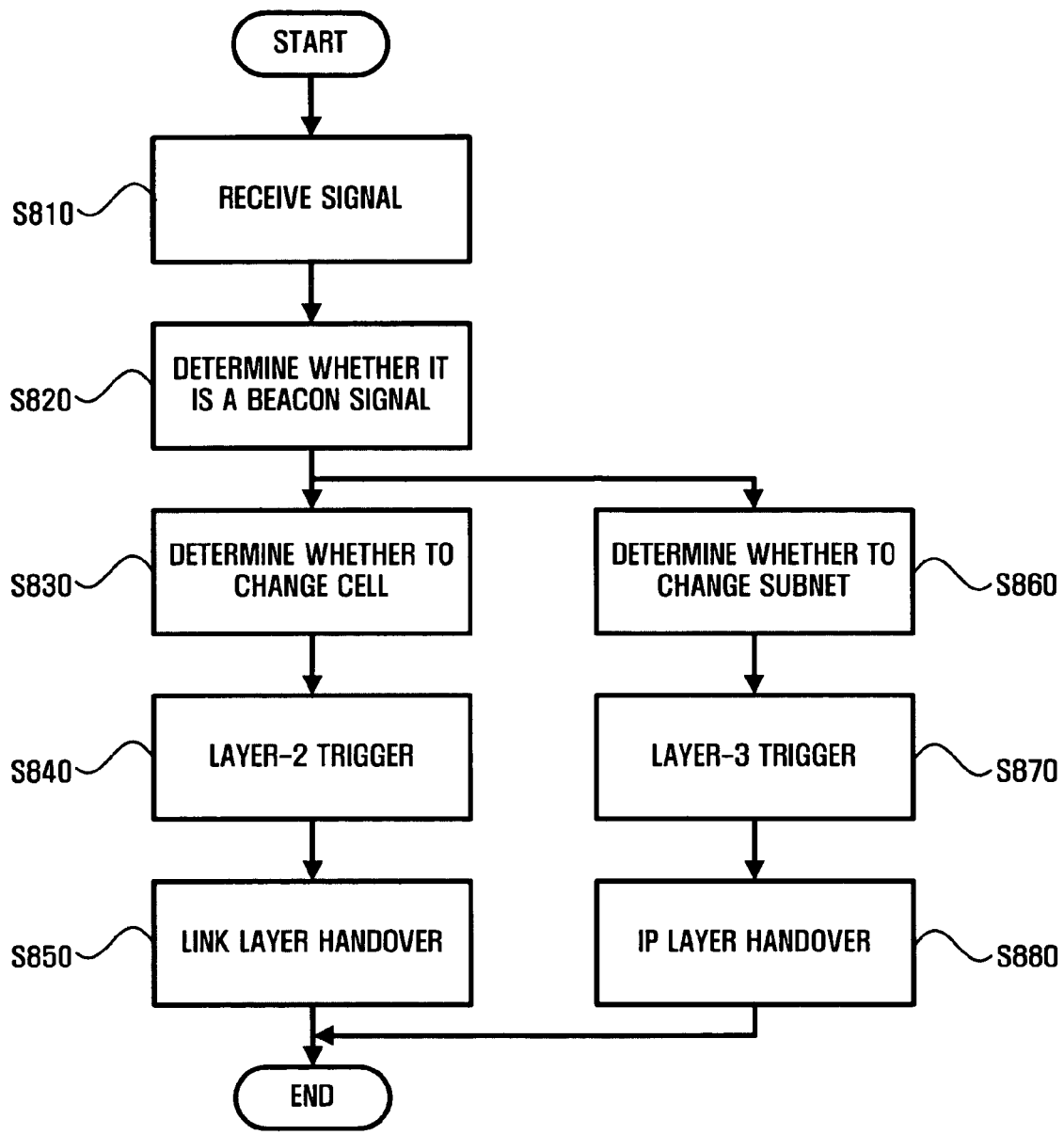
FIG. 8 is a flow chart illustrating operations of an apparatus that performs a fast handover according to an exemplary embodiment of the invention.

FIG. 8 is a flow chart illustrating operations of the apparatus 300 to perform a handover according to an exemplary embodiment and aspects of the invention. The mobile node 4 receives a signal from the access point 200 at operation S810. Then, the mobile node 4 determines whether the received signal is a beacon signal at operation S820 by checking whether the subtype field value of the received frame is 100, for example.

When it is determined that the received signal is a beacon signal, the mobile node 4 checks the cell ID included in the beacon signal and determines whether to perform a cell change at operation S830. The mobile node 4 can determine that a cell change has occurred based on the value included in the IBSS field 40732, for example, according to aspects of the invention. In this regard, by comparing the previous cell ID with the current cell ID, the mobile node 4 determines whether a cell change has occurred. Depending upon the determination as to whether a cell change has occurred, the mobile node 4 performs the layer-2 trigger at operation S840 and then a handover according to the layer-2 trigger at operation S850 when a cell change has occurred. In this regard, when it is determined that the mobile node 4 is in a new cell, the mobile node 4 performs the handover in the link layer.

Also, when it is determined that the received signal is a beacon signal, the mobile node 4 checks the access router ID included in the beacon signal. By comparing the previously stored access router ID with the current access router ID, the mobile node 4 determines if the subnet has changed at operation S860. In this regard, the mobile node checks the access router ID by referring to the reserved field of the capability information field of the frame body field of the beacon frame, such as the reserved field 40736 of the capability information field 4073 of the frame body field 407 of the beacon frame 400, according to aspects of the invention. Depending upon the determination as to whether the subnet has changed, the mobile node 4 performs the layer-3 trigger at operation S870 and a handover according to the layer-3 trigger at operation S880, when it is determined that the subnet has changed. In this regard, when it is determined that its subnet has changed, the mobile node 4 performs the handover in the IP layer. The mobile node 4 obtains a network prefix of the new subnet, and generates a new IP address for use in the new subnet.

As described above, the apparatus and the method of performing fast handovers according to the embodiments and aspects of the invention can provide one or more of the following or other effects. One effect is that, by providing a mobile node with information on the basis of which the mobile node determines whether to perform only the link layer handover, or both a link layer handover and an IP link handover, unnecessary communications with access routers can be eliminated or significantly reduced, to allow the mobile node to perform relatively fast handovers. Another effect is that by adding only one element of an access point among elements thereof, a change in configuration of the existing access points can be minimized.

The foregoing embodiments, aspects and advantages are merely exemplary and are not to be construed as limiting the invention. Also, the description of the embodiments of the invention is intended to be illustrative, and not to limit the scope of the claims, and various other alternatives, modifications, and variations will be apparent to those skilled in the art. Further, while not required in all aspects, elements of the invention can be implemented using software and/or firmware readable by one or more processors. Moreover, while the example embodiments and aspects of the invention have been described in the context of frames used in an IEEE 802.11 compliant system, it is understood that the aspects of the invention can be used in other networks in which handovers between access points of cells, such as handovers in a link layer, and/or handovers in an IP layer are preformed. Therefore, although a few embodiments of the invention have been shown and described, it would be appreciated by those skilled in the art that changes may be made in the embodiments without departing from the principles and spirit of the invention, the scope of which is defined in the claims and their equivalents.

What is claimed is:

1. An apparatus to perform a handover, the apparatus comprising:
 a signal receiving unit to receive a signal;
 a cell change determining unit to determine when a cell change has occurred by referring to a cell identification ID included in the received signal;
 a subnet change determining unit to determine when a subnet change has occurred by referring to the access router ID included in the received signal;
 a trigger unit to selectively perform a single layer trigger and a combination of layer triggers, depending upon the determination results of whether one or more of the subnet change and the cell change has occurred; and
 a handover performing unit to perform a handover according to the layer trigger, when the subnet change has occurred.

2. The apparatus of claim 1, wherein:
 the access router ID comprises information sent by an access point included in the same subnet.

3. The apparatus of claim 1, wherein:
 the trigger unit receives a frame including a parameter indicating one or more of the cell change and the subnet change, and
 the trigger unit performs the layer trigger with reference to the parameter included in the frame.

4. The apparatus of claim 3, wherein:
 the frame comprises one or more of a cell change flag, a new cell ID, a subnet change flag, a changed subnet or combinations thereof.

5. The apparatus of claim 3, wherein:
 the trigger unit performs a layer-2 trigger depending upon whether the cell change has occurred, and
 the trigger unit performs a layer-3 trigger depending upon whether the subnet change has occurred.

6. The apparatus of claim 3, wherein:
 the received signal comprises a beacon signal, and
 the access router ID is included in a beacon frame in the beacon signal, the beacon frame including a reserved field that includes the access router ID.

7. The apparatus of claim 3, wherein:
 the apparatus performs a fast handover of a mobile node based upon one or more of the access router ID or information indicating the cell change included in the received signal.

8. The apparatus of claim 1, wherein:
 the received signal comprises a beacon signal, and
 the access router ID is included in a beacon frame in the beacon signal, the beacon frame including a reserved field that includes the access router ID.

9. The apparatus of claim 1, wherein:
 the received signal includes a frame that includes the access router ID, the access router ID being included in a reserved field in the frame.

10. The apparatus of claim 1, wherein:
 the trigger unit performs a layer-2 trigger depending upon whether the cell change has occurred, and
 the trigger unit performs a layer-3 trigger depending upon whether the subnet change has occurred.

11. The apparatus of claim 10, wherein:
 the trigger unit receives a trigger frame including a parameter indicating one or more of the cell change and the subnet change, and
 the trigger unit performs the layer trigger with reference to the parameter included in the trigger frame.

12. The apparatus of claim 11, wherein:
 the trigger frame comprises one or more of a cell change flag, a new cell ID, a subnet change flag, a changed subnet, or combinations thereof.

13. The apparatus of claim 1, wherein:
 the apparatus performs a fast handover of a mobile node based upon one or more of the access router ID or the cell ID information included in the received signal.

14. An apparatus to perform a handover, the apparatus comprising:
 a beacon signal generating unit to generate a beacon signal including a cell identification (ID);
 an access router ID inserting unit to insert an access router ID into the beacon signal; and
 a signal transmitting unit to transmit the beacon signal that includes the access router ID and the cell ID, the access router ID and the cell ID being used by a receiving device to make a determination as to whether to selectively perform a single layer trigger and a combination of layer triggers based upon whether one or more of the access router ID indicates that a subnet change has occurred and the cell ID indicates that a cell change has occurred.

15. The apparatus of claim 14, wherein:
 the access router ID inserting unit inserts the access router ID in a frame included in the beacon signal, the access router ID being included in a reserved field in the frame.

16. A method of performing a handover, the method comprising:
 receiving a signal;
 determining whether a cell change has occurred by referring to a cell identification (ID) included in the received signal;
 determining whether a subnet has changed by referring to an access router ID included in the received signal;
 selectively performing a single layer trigger and a combination of layer triggers depending upon the determination results of whether one or more of the subnet and the cell has changed; and
 performing the handover, when the subnet has changed, according to the performed layer trigger.

17. The method of claim 16, wherein:
 the access router ID comprises information sent by an access point in the same subnet.

18. The method of claim 16, wherein the performing of the layer trigger comprises:
 receiving a frame including a parameter indicating one or more of the cell change or the subnet change, and
 performing the single layer trigger or the combination of layer triggers with reference to the parameter included in the frame.

19. The method of claim 18, wherein:
 the frame includes one or more of a cell change flag, a new cell ID, a subnet change flag, a new subnet, or combinations thereof.

20. The method of claim 18, wherein the performing of the layer trigger comprises:
 performing a layer-2 trigger depending upon whether the cell change has occurred, and
 performing a layer-3 trigger depending upon whether the subnet change has occurred.

21. The method of claim 18, wherein the performing the handover comprises:

performing a fast handover of a mobile node based upon one or more of the access router ID or cell change information included in the received signal.

22. The method of claim 16, wherein the performing the handover comprises:
performing a fast handover of a mobile node based upon the access router ID included in the received signal.

23. The method of claim 16, wherein:
the received signal includes a frame that includes the access router ID, the access router ID being included in a reserved field in the frame.

24. A method of performing a handover, the method comprising:
generating a beacon signal;
inserting a cell identification (ID) and an access router ID into the beacon signal; and
transmitting the beacon signal that includes the access router ID and the cell ID, the access router ID and the cell ID being used by a receiving device to make a determination as to whether to selectively perform a single layer trigger and a multiple layer trigger based upon whether one or more of the access router ID indicates that a subnet change has occurred and the cell ID indicates that a cell change has occurred.

25. The method of claim 24, wherein the transmitting the beacon signal further comprises:
transmitting the beacon signal that includes the access router ID to a mobile node.

26. The method of claim 24, wherein the inserting the access router ID further comprises:
inserting the access router ID into a beacon frame.

27. The method of claim 26, wherein the transmitting the beacon signal further comprises:
transmitting the beacon signal that includes the beacon frame including the access router ID to a mobile node.

28. The method of claim 24, wherein the transmitting the beacon signal further comprises:
transmitting the beacon signal that includes a beacon frame including the access router ID to a mobile node.

29. The method of claim 24, wherein the inserting the access router ID further comprises:
inserting the access router ID into a beacon frame included in the beacon signal, the access router ID being included in a reserved field in the beacon frame.

30. The method of claim 24, further comprising:
receiving by a mobile node the beacon signal that includes the access router ID and the cell ID;
determining whether a cell of the mobile node has changed by referring to the cell ID included in the beacon signal;
determining whether a subnet of the mobile node has changed by referring to the access router ID included in the beacon signal;
selectively performing the single layer trigger and the combination of layer triggers depending upon the determination results of whether at least one of the subnet and the cell of the mobile node has changed; and
performing the handover, when at least one of the subnet and the cell of the mobile node has changed, according to the performed single or multiple layer trigger.

31. The method of claim 30, wherein:
the access router ID comprises information sent by an access point in the same subnet.

32. The method of claim 30, wherein the performing of the layer trigger comprises:
receiving a trigger frame including a parameter indicating one or more of the cell change or the subnet change, and performing the layer trigger with reference to the parameter included in the trigger frame.

33. The method of claim 32, wherein:
the trigger frame includes one or more of a cell change flag, a new cell ID, a subnet change flag, a new subnet, or combinations thereof.

34. The method of claim 32, wherein the performing the handover comprises:
performing a fast handover of the mobile node based upon one or more of the access router ID or information indicating the cell change included in the beacon signal.

35. The method of claim 30, wherein the performing the handover comprises:
performing a fast handover of a mobile node based upon the access router ID included in the beacon signal when the subnet of the mobile node has changed.

36. The method of claim 24, further comprising:
performing a fast handover of a mobile node based upon the access router ID included in the beacon signal when a subnet of a mobile node has changed.

37. A network to perform a handover, the network comprising:
a beacon signal generating unit to generate a beacon signal including a cell identification (ID);
an access router ID inserting unit to insert an access router ID into the beacon signal;
a signal transmitting unit to transmit the beacon signal that includes the access router ID and the cell ID;
a signal receiving unit to receive the beacon signal;
a cell change determining unit to determine when a cell change has occurred by referring to the cell ID included in the beacon signal;
a subnet change determining unit to determine when a subnet of a mobile node has changed by referring to the access router ID included in the beacon signal;
a trigger unit to selectively perform a single layer trigger and a combination of layer triggers, depending upon the determination results of whether one or more of the subnet change and the cell change has occurred; and
a handover performing unit to perform a handover according to the layer trigger, when the subnet change has occurred.

38. The network of claim 37, wherein:
the access router ID comprises information sent by an access point included in the same subnet.

39. The network of claim 37, wherein:
the trigger unit receives a trigger frame based upon information included in the beacon signal, the trigger frame including a parameter indicating one or more of the cell change and a subnet change, and
the trigger unit performs the layer trigger with reference to the parameter included in the trigger frame.

40. The network of claim 39, wherein:
the trigger frame comprises one or more of a cell change flag, a new cell ID, a subnet change flag, a changed subnet, or combinations thereof.

41. The network of claim 39, wherein:
the trigger unit performs a layer-2 trigger depending upon whether the cell change has occurred, and
the trigger unit performs a layer-3 trigger depending upon whether the subnet change has occurred.

42. The network of claim 41, wherein:
the apparatus performs a fast handover of a mobile node based upon one or more of the access router ID or the cell ID information included in the beacon signal.

43. The network of claim 37, wherein:
the apparatus performs a fast handover of a mobile node based upon one or more of the access router ID or the cell ID information included in the beacon signal.

44. The network of claim 37, wherein:
the trigger unit performs a layer-2 trigger depending upon whether the cell change has occurred, and
the trigger unit performs a layer-3 trigger depending upon whether the subnet change has occurred.

45. The network of claim 37, wherein:
the access router ID inserting unit inserts the access router ID in a frame included in the beacon signal, the access router ID being included in a reserved field in the frame.

46. An apparatus to perform a handover, the apparatus comprising:
a signal receiving unit to receive a signal;
a beacon signal determining unit to determine when the received signal is a beacon signal;
a cell identification (ID) checking unit to check a cell ID in information included in the beacon signal;
a cell change determining unit to determine when a cell change of a mobile node has occurred by referring to the cell ID information included in the beacon signal;
an access router ID checking unit to check an access router ID in information included in the beacon signal;
a subnet change determining unit to determine when a subnet change has occurred by referring to the access router ID included in the beacon signal;
a trigger unit to selectively perform a single layer trigger and a combination of layer triggers, depending upon the determination results of whether one or more of the subnet change and the cell change has occurred; and
a handover performing unit to perform a handover according to the layer trigger.

47. The apparatus of claim 46, wherein:
the handover performing unit comprises:
a link layer handover performing unit to perform a handover in a link layer when the cell change has occurred; and
an internet protocol (IP) performing unit to perform a handover in an IP layer when a subnet change has occurred.

48. The apparatus of claim 47, wherein:
the access router ID is included in a beacon frame in the beacon signal, the beacon frame including a reserved field that includes the access router ID.

49. The apparatus of claim 46, wherein:
the access router ID is included in a beacon frame in the beacon signal, the beacon frame including a reserved field that includes the access router ID.

* * * * *